United States Patent [19]

Date et al.

[11] 4,204,762
[45] May 27, 1980

[54] CENTRIFUGAL BRAKES FOR FOCAL PLANE SHUTTERS

[75] Inventors: Nobuaki Date; Hiroshi Aizawa, both of Kawasaki; Masanori Uchidoi, Yokohama; Masami Shimizu, Tokyo; Teiji Hashimoto, Kawasaki, all of Japan

[73] Assignee: Canon Kabushiki Kaisha, Tokyo, Japan

[21] Appl. No.: 942,031

[22] Filed: Sep. 13, 1978

[30] Foreign Application Priority Data

Sep. 26, 1977 [JP] Japan .................................. 52-115699

[51] Int. Cl.² .............................................. G03B 9/32
[52] U.S. Cl. ...................................... 354/242; 354/252
[58] Field of Search .............................. 354/241–244, 354/252

[56] References Cited

U.S. PATENT DOCUMENTS

| 1,707,849 | 4/1929 | Fairchild | 354/241 |
| 2,758,527 | 8/1956 | McFadden | 354/242 |

*Primary Examiner*—John Gonzales
*Attorney, Agent, or Firm*—Toren, McGeady and Stanger

[57] ABSTRACT

In a focal plane shutter having two curtains which unwind from shafts after being released, the shaft controls a master gear, causing a keying pin on the latter to activate braking action on the curtain at a time interval near the terminal end of running-down movement of the curtain, as a pair of heavy expanding frictional shoes are driven to rotate at accelerated speeds and pressed against the internal surface of a fixed drum by a centrifugal force. During the shutter cocking operation, the key is taken out of connection with the brake so that the driving torque of the film winding shaft is correspondingly decreased.

9 Claims, 1 Drawing Figure

U.S. Patent      May 27, 1980      4,204,762
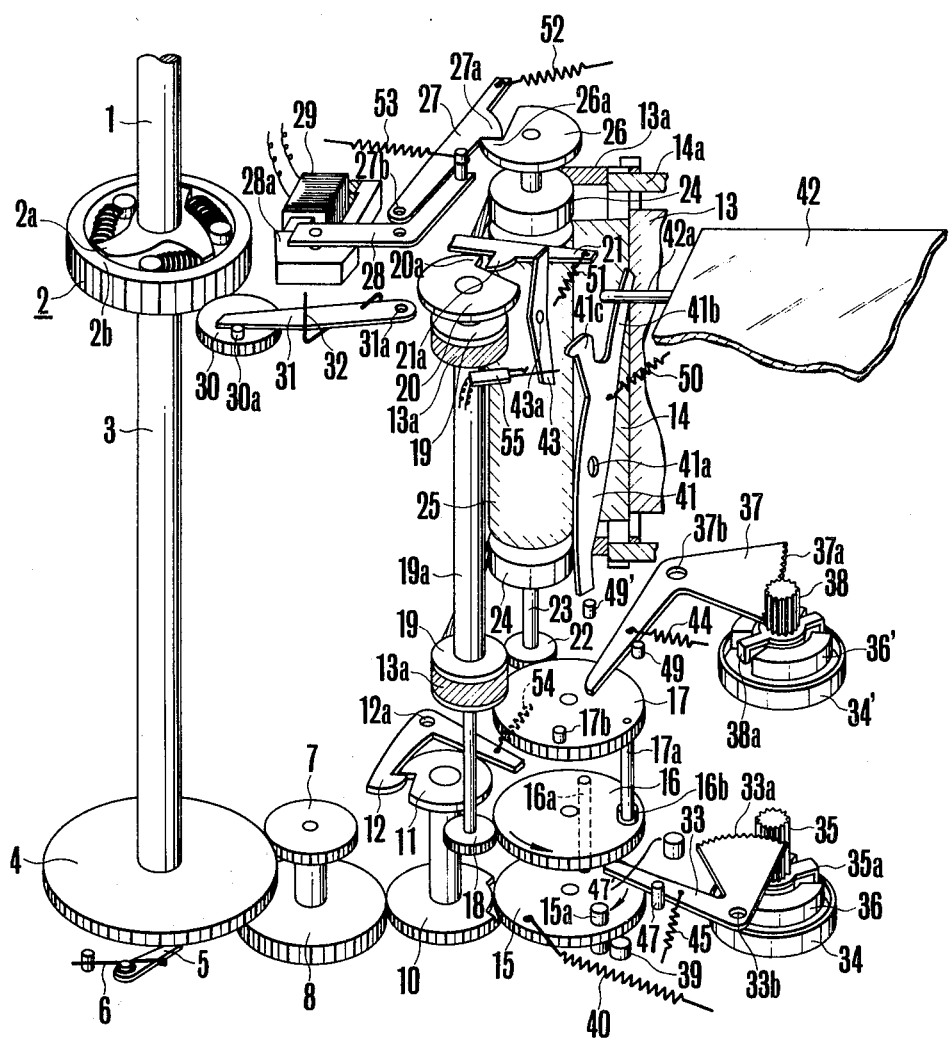

CENTRIFUGAL BRAKES FOR FOCAL PLANE SHUTTERS

This invention relates to brakes for focal plane shutters.

The conventional brakes for focal plane shutters propose a wide variety of structures most of which utilize a frictional force of leather or metal, or an impact of a shutter control member on an inertial mass.

The brake using the leather is, however, susceptible to wide variation of braking action with temperature, humidity and time, and the one using the metal tends to become damaged by excessive heat developed due to the vaporization of the lubricant oil, abrasion and the like.

In addition, these frictional brakes give up the frictional force to the shutter cocking mechanism so that the driving torque of the film winding lever is increased.

Further, the faulty operation of the camera, for example, the variation of speed of the shutter by intentionally stopping the trailing curtain, leads to a high possibility of occurrence of imbalance between the inertia of the moving shutter and the braking action. If so, the shutter is inhibited from reaching the terminal end of a normal range of movement, it being thereby made impossible to release the shutter cocking mechanism from latching connection, and to effect automatic return movement of the mirror.

On the other hand, the impact form of brake is freed not only from the variation due to the temperature, humidity and time and the increase in the driving torque, but also from the accidental stoppage of the trailing curtain even when the aforesaid faulty operation is performed, since the brake is no longer effective in the slow speed of movement of the shutter. The brake of impact on the inertial mass is, however, required to make use of a large inertia, or otherwise the energy of the moving shutter can not be absorbed completely at the time of impact, as the braking effect on the shutter is rapidly lost with the start of movement of the inertial mass. This calls for an increase in space within the camera housing. Another disadvantage is that the sudden stop of movement of the shutter shortens the life-time of the shutter control mechanism.

In order to provide a brake for a shutter which has overcome the aforesaid disadvantages of the conventional brakes, the present invention contemplates the use of a centrifugal governor as the brake acting on the master gear which rotates along with movement of the leading or trailing curtain at a time when the curtain nears the terminal end of movement.

This centrifugal governor type brake has many advantages that the braking action is not susceptible to variation with temperature, humidity and time, that when the governor rotates at a slow speed, there is little braking force exerted to prevent the driving torque of the film winding lever from being increased, and that even when the aforesaid faulty operation is encountered, it is possible to ensure the full range of movement of the shutter.

It is noticed that, unlike the inertia type brake, the braking action on the shutter reaches a maximum, not at a time of impact, but when the centrifugal governor is rotating at a maximum rate. Accordingly, the shutter is braked without overloading the control mechanism thereof.

The present invention will next be described in connection with a preferred embodiment thereof applied to a single lens reflex camera.

The single FIGURE is a perspective view of a film winding and shutter cocking mechanism associated with two centrifugal brakes in the cocked position.

A driving shaft 1 has an arm, not shown, fixedly secured to the top end thereof, the bottom end of which is fixedly connected to a hub 2a of a one-way clutch 2. A driven shaft 3 is connected to a rim 2b of the clutch 2 at the top end, the bottom end of the shaft 3 being connected to a larger gear 4. The gear 4 cooperates with a pawl lever 5 under the action of a spring 6 so that a sprocket spool, not shown, is prevented from moving in the reverse direction. The gear meshes with an intermediate gear 7 on a common shaft of another intermediate gear 8 which latter meshes with a gear 10 of a film advance cycle control cam disk 11. The disk 11 cooperates with a pawl lever 12.

A focal plane shutter has a leading or front curtain 13 and a trailing or rear curtain 14. On the upper and lower sides of the left border of the front curtain 13, there are tapes 13a, the ends of which are wound on two winding drums 19 after having passed around respective idlers 24 which are freely mounted on a shaft 23. The drums 19 are fastened on a common shaft 19a whose bottom end is connected to a pinion 18 meshing with the master gear 16, and whose top end fixedly carries a cam disk 20. The rear curtain 14 is initially wound on a drum 25, which is fastened on the shaft 23. The shaft 23 fixedly carries a pinion 22 meshing with the master gear 17 at the bottom end thereof, the top end of which fixedly carries a cam disk 26. On the upper and lower sides of the right border of the rear curtain 14 there are tapes 14a, the ends of which are attached to a spring drum, not shown.

A centrifugal governor type brake device for the front curtain in accordance with the invention comprises a keying pin 16a downwardly protruding over the lower surface of the master gear 16, an operating lever 33 having an arm disposed in a key-way between stopper pins 47 and 47' and another arm formed to provide a sector gear 33a and pivotally mounted at 33b on a camera housing, not shown, a pinion 35 meshing with the sector gear 33a and rotatable about a shaft, not shown, fixedly mounted within a stationary drum 34, a flyball mechanism including a toe 35a fixedly mounted on the pinion 35, two weights 36 of semi-circular shape having an outer diameter almost equal to the inner diameter of the drum 36 and made of a wear-resisting material such as plastic or metal, a cap, not shown, covering over the toe 35a and weight 36, and a spring 45 urging the lever 33 for counter-clockwise movement as viewed in the figure. Another brake device for the rear curtain is similar in construction to the aforesaid front curtain brake device and is arranged to cooperate with a keying pin 17b protruding over the upper surface of the master gear 17.

When a shutter button, not shown, is depressed, automatic adjustment of a camera diaphragm, not shown, is followed by counter-clockwise movement of a mirror drive lever 41 about a pivot axle 41a which causes a mirror 42 to be flipped up by an arm 41b in engagement with a rod 42a and which also causes an actuating lever 43 to be turned about a pivot 43a in a clockwise direction by another arm 41c. Such clockwise movement of the actuating lever 43 causes a latching lever 21 to disengage from the cam disk 20, as a pawl 21a is moved away from a cam lug 20a, thereby the front curtain 13 is released to run down, while the master gear 16 is rotated in a counter-clockwise direction indicated by an arrow by the pinion 18. When the front curtain nears the terminal end of movement, the keying pin 16a arrives at the lever 33 and then drives the latter in the clockwise direction while the two weights 36 are simultaneously pressed against the internal surface of the drum 34 by a centrifugal force. The pinion 35 rotates at a far faster speed than that of rotation of the master gear 16, since the radius of the sector gear 33a is designed to be far larger than that of the pinion 35. The friction force between the internal surface of the drum 34 and the expanding weights 36 activates a braking action on the master gear 16. It is proven that this braking action is proportional to the second power of the speed of rotation of the master gear 16. This fact is very advantageous as the property of the brake.

After the elapse of a predetermined time interval from the time at which a count start switch 55 is opened by the actuating lever 43, a magnetic winding 29 is energized to cancel the magnetic flux of a permanent magnet, not shown, thereby an armature 28a is moved away from the yoke of the electromagnetic actuator 29 by the action of a spring 53 through a lever 28. As the lever 28 is turned in a counter-clockwise direction, a rear curtain latching lever 27 is turned about a common axis of the lever 28 in engagement with a pin against the force of a spring 52 so that a pawl 27a is disengaged from a cam lug 26a. At this time, the rear curtain 14 starts to wind off the drum 25 while simultaneously rotating the master gear 17 through the pinion 22. When the curtain 14 completely closes an exposure aperture, not shown, the keying pin 17b contacts an arm of a lever 37, and then moves the lever 37 in a clockwise direction about a pivot axis 37b until the arm is stopped by a pin 49'. In the movement of the lever 37 through the keyway, two weights 36' are pressed against the internal surface of a fixed drum 34' by a flyball mechanism having a pinion 38 engaging with a sector gear 37a of the lever 37. At the terminal end of movement of the master gear 17, a downwardly extending pin 17a strikes the pawl lever 12 at its tail to thereby make ready the next cycle of film winding operation.

When the winding lever is cocked, motion of the driving shaft 1 is transmitted through the one-way clutch 2 to a resetting gear 30 and to the driven shaft 3. Motion of the shaft 3 is transmitted through the gears 4, 7 and 8 to the control gear 10. As the gear 30 rotates one revolution, a lever 31 reciprocates in normally abutting engagement with a pin 30a so that in the first half revolution of gear 30, the armature 28a is brought back to the field of attraction force of the permanent magnet against the force of a spring 53. Such movement of the lever 28 is followed by movement of the latching lever 27 under the action of the spring 52. In one revolution of the gear 10, on the other hand, the gear 15 returns the front and rear curtain master gears 16 and 17 through a bar 15a-and-the keying pin 16a connection and through a bar 16b-and-the pin 17a connection respectively to the initial positions illustrated, thereby the front and rear curtains are wound on the drums 19 and 25. When the cam lugs 20a and 26a are radially aligned with the pawls 21a and 27a, the levers 21 and 27 are turned clockwise under the action of the springs 51 and 52. Thus, the front and rear curtains are latched in the cocked positions. As soon as this occurs, the lever pawl 12 is engaged with the cam lug 11 to stop rotation of the control gear 10. At this time, as the cutout of the gear 10 frees the gear 15 from the teeth of the gear 10, the gear 15 is returned by the action of a spring 40 to the initial position illustrated.

During this film winding and shutter cocking operation, the brake levers 33 and 37 are caused to follow up the respective keying pins 16a and 17b by the springs 45 and 44 respectively until they abut against the stoppers 47 and 49. Thus, the brake devices are reset without causing any increase in the driving torque of the film winding and shutter cocking mechanism.

It will be appreciated that the brake device of the invention has a higher efficiency when the speed of rotation of the master gear is faster, and activates little braking action on the shutter when the speed of movement of the shutter slows down. Accordingly the faulty operation of the shutter, as for example, by intentionally stopping the rear curtain within the framing aperture, does not lead to the failure of achieving the full range of movement of the rear curtain. Another disadvantage is that the braking action is not greatly affected by variation in temperature, humidity and age.

While the present invention has been described and illustrated with respect to a preferred example which gives the above-mentioned advantages, it will be understood by those skilled in the art that various changes and modifications may be made without departing from the spirit and scope of the invention as described hereinabove and as defined in the appended claims.

What is claimed is:

1. In a camera having a focal plane shutter provided with shutter shafts on which are wound shutter curtains, said shafts rotating in release and winding up operations, and master gears reciprocally rotatable within a limited range in connection with said shutter shafts for shutter cocking and shutter running down purposes, a brake device for the shutter comprising:
   a fixed brake drum, said brake drum having a shaft fixed at the center thereof, and a pinion rotatable about said shaft;
   a sector gear meshing with said pinion, and a brake lever having an arm engageable with said master gear, said brake lever being arranged to engage said master gear when the shutter nears the terminal end of movement, thereby motion of said master gear is transmitted to said pinion;
   an engagement member fixedly mounted to said pinion; and
   a plurality of slider pieces movably contained within said brake drum and having sliding surfaces conformed to the internal surface of said brake drum;
   said slider pieces being engaged with said pinion by said engagement member upon rotation at a high speed within said brake drum to be pressed with said sliding surfaces against the internal surface of said brake drum by a centrifugal force to produce a friction force which activates the braking action on said shutter shaft.

* * * * *